Patented Feb. 2, 1926.

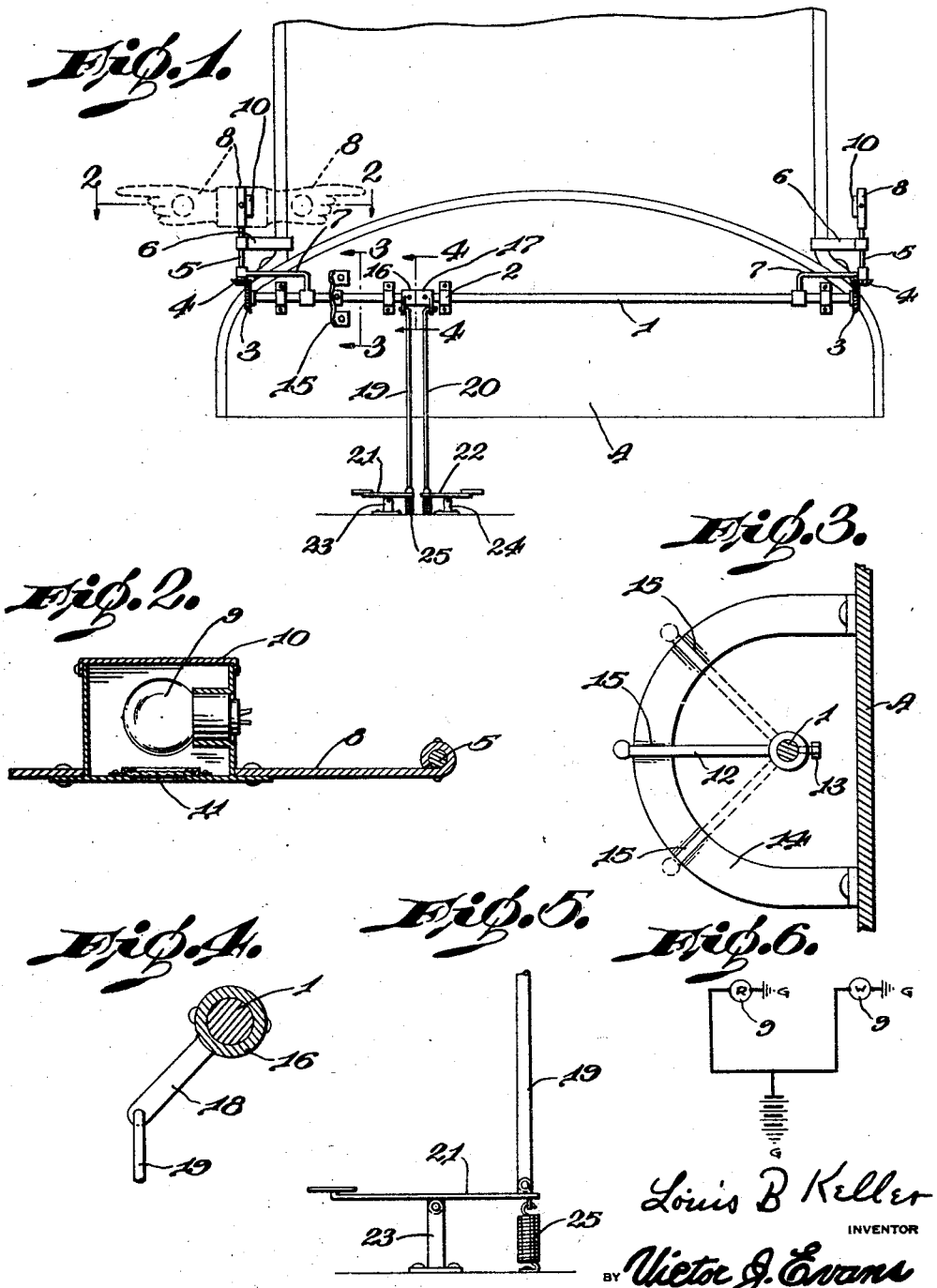

1,571,841

UNITED STATES PATENT OFFICE.

LOUIS B. KELLER, OF CHICAGO, ILLINOIS.

VEHICLE SIGNAL.

Application filed March 7, 1923. Serial No. 623,561.

*To all whom it may concern:*

Be it known that I, LOUIS B. KELLER, a citizen of the United States, residing at Chicago, in the county of Cook and State of Illinois, have invented new and useful Improvements in Vehicle Signals, of which the following is a specification.

This invention relates to a vehicle signal, and an object of the invention is to provide a practical, simple and easily operated signal mechanism by means of which a following motorist or other person may positively ascertain the direction about to be taken by the vehicle equipped with the signal mechanism, thereby materially eliminating the liability of collision or accident and also preventing congestion of traffic to a large extent.

Other objects of the invention will appear in the following detailed description taken in connection with the accompanying drawings wherein:—

Fig. 1 is a rear elevation of the improved signal mechanism.

Fig. 2 is a detail section on the line 2—2 of Fig. 1.

Fig. 3 is a fragmentary vertical section taken on the line 3—3 of Fig. 1.

Fig. 4 is a detail section taken on the line 4—4 of Fig. 1.

Fig. 5 is an enlarged detail in side elevation of a foot lever.

Fig. 6 is a diagrammatic view of the circuit embodied in the signal.

Referring more particularly to the drawings, the improved signal mechanism comprises a shaft 1 which is carried by the vehicle, street car, or the like upon which the signal is mounted. The shaft 1 is rotatably supported by suitable bearings 2 and it has beveled gears 3 mounted upon its opposite end. The beveled gears 3 mesh with beveled pinions 4 which are in turn mounted upon the lower end of substantially vertical shafts 5. The shafts 5 are rotatably supported by suitable bearing brackets 6 and 7 and they each have an indicating hand or semaphore 8 carried by their upper ends. The semaphores 8 are preferably in the shape of a hand, and they each carry an electric lamp bulb 9 enclosed in a suitable housing 10 and which is visible through a transparent window 11. A shaft 1 has a hand lever 12 mounted thereon and secured to the shaft by means of a set screw 13 for rocking the shaft through movement of said lever. A quadrant 14 is adapted to be mounted on the dash of the vehicle which is indicated at A, and the quadrant has depressions 15 formed therein which are adapted to receive the lever 12 to hold the lever in position and also to facilitate the proper adjustment of the semaphores. When the lever 12 is engaged in the central depression 15 the semaphores will point directly to the front indicating that the vehicle is traveling straight ahead. When the lever 12 is engaged in the uppermost of the depressions 15 or in the lowermost of the depressions, the semaphores will be swung synchronously either to the right or to the left to indicate the direction of turn that the vehicle is about to take.

The shaft 1 has collars 16 and 17 attached or pinned thereto upon which collars, arms 18 are formed. The arms 18 are connected to the rods 19 and 20 respectively. The lower ends of the rods 19 and 20 are pivotally connected to foot levers 21 and 22. The foot levers 21 and 22 are pivotally supported by suitable brackets 23 and 24 and their ends to which the rods 19 and 20 are connected have springs 25 connected thereto which normally return the rods 19 and 20 and consequently the shaft 1 to their normal positions after the respective foot levers have been operated to operate the semaphores 8. An arm 18 on the collar 16 extends upon the opposite side of the shaft 1 from the arm on the collar 17 so that when the foot lever 21 is pressed the shaft will be rotated in one direction and when the foot lever 22 is pressed the shaft will be rotated in the opposite direction whereby to swing the semaphore arms 8 in either direction.

It is, of course, to be understood that the invention may be constructed in other manners and the parts associated in different relations and, therefore, I do not desire to be limited in any manner except as set forth in the claims hereunto appended.

Having thus described my invention what I claim is:—

1. In a vehicle signal, a shaft, vertical shafts at each end of the first shaft, means operatively connecting the vertical shafts with the first shaft, signal members carried by upper ends of the vertical shafts, collars carried by the first shaft, arms extending from said collars upon opposite sides of the shaft and foot operated means connected to the arms whereby to rotate the shaft in either direction.

2. In a vehicle signal, a main shaft, vertical shafts at each end thereof, operative connection between the vertical shafts and the main shaft, signal means carried by the vertical shafts, collars carried by the main shaft, arms carried by the collars and extending upon opposite sides of the main shaft, pivoted foot levers, means connecting the foot levers with the arms whereby upon depression of the foot levers the main shaft may be rotated in either direction and yielding means for moving the foot levers out of their depressed position.

In testimony whereof I affix my signature.

LOUIS B. KELLER.